United States Patent
Hecker et al.

(10) Patent No.: US 6,522,956 B2
(45) Date of Patent: Feb. 18, 2003

(54) METHOD AND DEVICE FOR ESTIMATING A TRANSVERSE ACCELERATION AT AN AXLE OF A SEMITRAILER OR A TRAILER OF A VEHICLE COMBINATION

(75) Inventors: Falk Hecker, Markgroeningen (DE); Wolfgang Kraemer, Ingolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/836,569

(22) Filed: Apr. 17, 2001

(65) Prior Publication Data

US 2002/0128764 A1 Sep. 12, 2002

(30) Foreign Application Priority Data

Apr. 18, 2000 (DE) .......................................... 100 19 150

(51) Int. Cl.$^7$ .............................................. G01M 15/00
(52) U.S. Cl. ................. 701/1; 701/70; 701/36; 701/50; 701/78; 73/118.1
(58) Field of Search ................. 701/1, 70, 36, 701/41, 78, 50; 280/432, 426; 73/118.1; 180/197

(56) References Cited

U.S. PATENT DOCUMENTS 5,627,756 A * 5/1997 Fukada et al. ................. 701/70
5,747,683 A * 5/1998 Gerum et al. ............... 73/118.1

FOREIGN PATENT DOCUMENTS

DE          41 21 954          1/1993

* cited by examiner

Primary Examiner—William A. Cuchlinski, Jr.
Assistant Examiner—Marthe Y. Marc-Coleman
(74) Attorney, Agent, or Firm—Kenyon & Kenyon

(57) ABSTRACT

A method for estimating a transverse acceleration at an axle of a trailer/semitrailer of a vehicle combination including the step of measuring or estimating the yaw velocity $\omega_Z$ of the towing vehicle, measuring or estimating the forward velocity $v_{xZ}$ of the towing vehicle, measuring or estimating an articulation angle $\Delta\Psi$ between the towing vehicle and the trailer/semitrailer, particularly between a longitudinal axis $x_Z$ of the towing vehicle and a longitudinal axis $z_A$ of the trailer/semitrailer, and computationally correlating (or performing a relational operation on) the values $\omega_Z$, $v_{xZ}$ and $\Delta\Psi$ to obtain an estimated value of the transverse acceleration $a_{yAA}$ at the axle of the semitrailer/trailer.

9 Claims, 3 Drawing Sheets

METHOD AND DEVICE FOR ESTIMATING A TRANSVERSE ACCELERATION AT AN AXLE OF A SEMITRAILER OR A TRAILER OF A VEHICLE COMBINATION

FIELD OF THE INVENTION

The present invention relates to a method and a device for estimating a transverse acceleration at an axle of a semitrailer or trailer of a vehicle combination, in particular of an articulated vehicle combination, as well as a method for implementing a braking action on a semitrailer/trailer.

BACKGROUND INFORMATION

In operating dynamics, handling properties may be defined as the total performance of the system "driver-vehicle-environment." Criteria for assessing the operating dynamics may include, for example, the steering-wheel angle, the transverse acceleration, the longitudinal acceleration, the yaw velocity, as well as the float angle. Additional information is used to clarify specific handling properties, e.g., the forward velocity and transverse velocity, the steering angle of the front or back wheels, the slip angle at all wheels, as well as a steering-wheel force.

In German Published Patent Application No. 41 21 954 is discussed a method for determining the yaw velocity and/or the transverse velocity of a motor vehicle, which involves determining the vehicle's relevant quantities of motion using a minimum number of sensors.

For the electronic stability program (ESP) of articulated vehicle assemblies, braking-action strategies for preventing skidding are available, with such braking actions always being carried out at the towing vehicle. At present, it is believed that there are no satisfactory strategies for braking actions on a semitrailer or trailer of an articulated vehicle combination.

An electronic stability program for an articulated vehicle combination is used, for example, to stretch the articulated vehicle combination by braking the semitrailer or trailer when the towing vehicle is being oversteered, thereby making it possible to stabilize the towing vehicle and to prevent the articulated vehicle combination from jackknifing. However, such a braking action can reduce the lateral guiding force of the semitrailer/trailer axle so that, when cornering at a high transverse acceleration, there is the danger of the semitrailer or trailer breaking away (a so-called trailer swing). To prevent this, the braking action on the semitrailer or trailer should be carried out as a function of the transverse acceleration at the semitrailer/trailer axle. Measuring such a transverse acceleration at the semitrailer/trailer axle using suitable sensors may be relatively expensive, since, with respect to conventional articulated vehicle assemblies, additional and expensive sensor elements may be necessary. Such a procedure may be impractical, since a towing vehicle may change semitrailers or trailers, which are differently equipped.

SUMMARY OF THE INVENTION

An object of an exemplary method of the present invention is to provide a method on whose basis the transverse acceleration at the semitrailer/trailer axle is capable of being approximated in a simple and cost-effective manner.

Using the exemplary method according to the present invention, it is believed that the transverse acceleration at the semitrailer/trailer axle may be estimated in an uncomplicated manner, without additional outlay for sensors, i.e., solely on the basis of the measured quantities measured or determined at the towing vehicle. Using the exemplary method according to the present invention, it is also believed to be possible to attain particularly reliable estimated values, for which a relatively small amount of computational work in a control unit may be necessary for this purpose. According to the exemplary method of the present invention, to satisfactorily estimate the transverse acceleration at the axle of the semitrailer/trailer, it is believed to be sufficient to ascertain (by measuring or estimating, as is explained below) the yaw velocity and the forward velocity of the towing vehicle. According to another exemplary method of the present invention, it is believed to be sufficient in comparable fashion to determine the forward velocity of the towing vehicle and the articulation angle between the towing vehicle and the semitrailer/trailer.

In accordance with the first exemplary method of the present invention, the transverse acceleration sought is determined as a function of the determined forward velocity of the towing vehicle and as a function of the determined yaw velocity of the towing vehicle. For this purpose, in an intermediate step, the articulation angle is first determined from the two input variables using equation 8, which is explained below. The transverse acceleration sought is ascertained as a function of the articulation angle and of the forward velocity, using equations 9 and 10, respectively, which are explained below.

In the second exemplary method of the present invention, where it is assumed that it is possible to measure or estimate the articulation angle, the forward velocity is also determined, either using a suitable sensor arrangement or structure or according to the abovementioned equation 8. Using the indicated equations 9 and 10, respectively, the two input variables, forward velocity and articulation angle, yield the transverse acceleration sought. With regard to the use of the term "to determine," it should be indicated that forward velocity values and yaw velocity values are typically provided by other functions or components of an electronic stability program, i.e., are typically able to be measured. As such, the articulation angle can be estimated using the presently proposed exemplary method, provided that this is necessary, because the articulation angle is not necessarily or does not necessarily have to be made available by other electronic stability program components or electronic stability program functions. Furthermore, the articulation angle can in principle also be determined, for example, using a potentiometer, as referred to in the German Published Patent Application No. 39 23 677.

One concern, however, may be that this measuring principle may require devices at the towing vehicle and at the semitrailer or trailer.

Advantageously, the distance between the semitrailer/trailer axle and the trailer hitch or the kingpin of the towing vehicle may be taken into account when computationally correlating the yaw velocity and the forward velocity of the towing vehicle, as well as the articulation angle between the towing vehicle and semitrailer/trailer and the forward velocity.

According to another exemplary method of the present invention, when performing the computational correlation (relational operation), it is assumed that a transverse velocity existing at the semitrailer/trailer axle is equal to zero, or that the semitrailer/trailer axle does not have a slip angle. On the basis of this assumption, it is believed that a particularly simple, kinematic single-track model can be created for estimating the transverse acceleration at the semitrailer/trailer axle, since it is assumed to a certain extent here that the semitrailer or trailer "is driven as if on a track." In what is believed to be a particularly significant situation pertaining to operating dynamics, namely in the case of an oversteering towing vehicle and a non-skidding semitrailer or trailer, this supposition is believed to be effectively satisfied, so that the transverse acceleration of the semitrailer/trailer axle can be particularly accurately estimated for the dangerous situations indicated at the outset.

According to another exemplary method according to the present invention, an articulation angle $\Delta\Psi$ is estimated on the basis of its time derivative $\Delta\dot\Psi$, taking yaw velocities $\omega_Z$, $\omega_A$ of the towing vehicle and semitrailer or trailer as a basis to obtain an estimated value $\Delta\dot\Psi$, where the yaw velocity $\omega_A$ of the semitrailer or trailer is represented in the form of:

$$\frac{V_{xZ}}{1_A} \cdot \sin\Delta\Psi.$$

The specified relations are believed to be particularly valid when the transverse velocity $v_{KyZ}$ of the towing vehicle at the kingpin or at the trailer hitch is disregarded.

DETAILED DESCRIPTION

Figure 1:
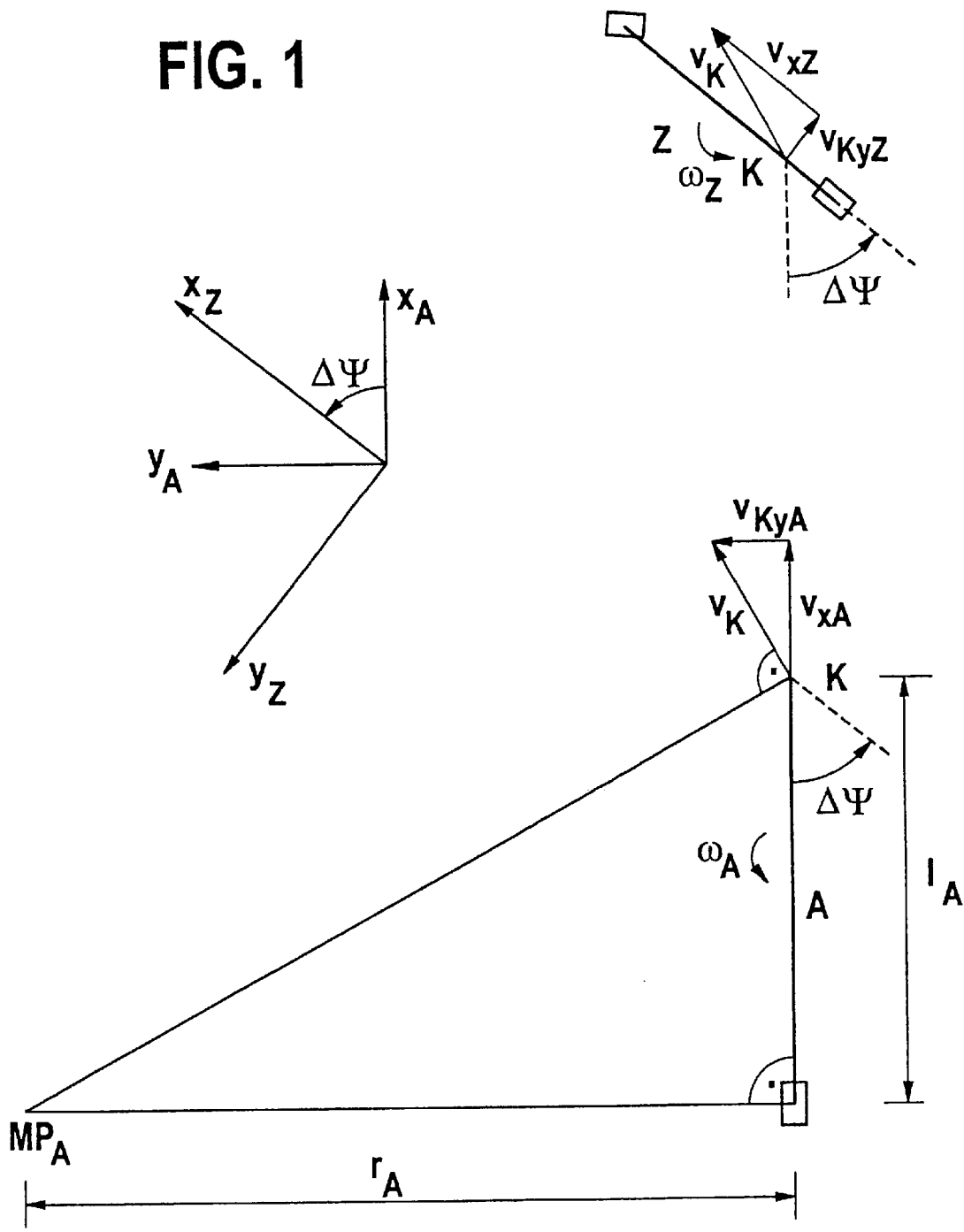
FIG. 1 is a schematic single-track representation of the measured quantities or evaluated quantities taken into consideration in the exemplary method according to the present invention for an articulated vehicle assembly.

To estimate the transverse acceleration at the semitrailer/trailer axle of an articulated vehicle combination in accordance with the exemplary embodiment of the present invention, a simple, kinematic single-track model is taken as a basis. This means that it is assumed that the transverse velocity at the semitrailer/trailer axle is equal to zero, or that the semitrailer/trailer axle does not have a slip angle. This model is represented in FIG. 1, which includes towing vehicle Z and semitrailer/trailer A, which are joined to one another in a pivoted manner at coupling point K via a kingpin, being separately represented for the sake of clarity. Only one semitrailer/trailer axle is represented in FIG. 1. However, this axle can represent a plurality of combined axles. This model-based or model-like view is possible when the distance between axles is small with respect to the semitrailer length or trailer length. Furthermore, in this context, the axle or axles of the semitrailer/trailer should not be steerable. Finally, the rotary relative movement between the towing vehicle and the semitrailer/trailer should have a degree of freedom, namely the rotation at the coupling point. The specified conditions are satisfied for all passenger vehicle combinations and, in addition to articulated vehicle combinations, also for trucks including a trailer or semitrailer having an axle center. The exemplary method according to the present invention can be applied to such vehicle combinations. Finally, it must be indicated that the term "axle of a semitrailer or trailer" used in the framework of the present application is intended, on the one hand, to include a trailer or semitrailer only having one axle. On the other hand, this term can also signify that, for a trailer or semitrailer having more than one axle, e.g., three or four axles, the axles are combined to form one "resulting" axle for the purpose of being considered in the model. Moreover, FIG. 1 shows the coordinate systems of the towing vehicle and trailer/semitrailer, the x-axes indicating the longitudinal direction of each partial vehicle.

The designations used in FIG. 1 have the following meanings:

$x_A$ X-axis of the semitrailer/trailer
$y_A$ Y-axis of the semitrailer/trailer
$x_Z$ X-axis of the towing vehicle
$y_Z$ Y-axis of the towing vehicle
$v_K$ Velocity at the coupling point
$v_{xA}$ Forward velocity of the semitrailer/trailer
$v_{KyA}$ Transverse velocity of the semitrailer/trailer at the coupling point
$v_{xZ}$ Forward velocity of the towing vehicle
$v_{KyZ}$ Transverse velocity of the towing vehicle at the coupling point
$\omega_Z$ Yaw velocity of the towing vehicle
$\omega_A$ Yaw velocity of the semitrailer/trailer
$\Delta\Psi$ Articulation angle
$r_A$ Curve radius of the semitrailer/trailer
$l_A$ Distance from the kingpin to the semitrailer/trailer axle (Length of the semitrailer/trailer)
$MP_A$ Instantaneous pole of the semitrailer/trailer (i.e., the point about which the semitrailer/trailer is currently rotating).

The following relation exists between the velocity components at the coupling point:

$$v_{xA}=v_{xZ}\cdot\cos\Delta\Psi - v_{KyZ}\cdot\sin\Delta\Psi,$$

$$v_{KyA}=v_{xZ}\cdot\sin\Delta\Psi - v_{KyZ}\cdot\cos\Delta\Psi.$$

The geometrical relations shown in FIG. 1 result in the curve radius:

$$r_A = l_A \cdot \frac{v_{xA}}{v_{KyA}} \qquad (2)$$

and the yaw velocity:

$$\omega_A = \frac{v_{xA}}{r_A} = \frac{v_{KyA}}{l_A}. \qquad (3)$$

The transverse acceleration at the trailer/semitrailer axle is:

$$a_{yAA} = \omega_A \cdot v_{xA} = \frac{v_{xA} \cdot v_{KyA}}{l_A}. \qquad (4)$$

Velocity components $v_{xA}$ and $V_{KyA}$ in the coordinate system of the trailer or semitrailer are not known and must, therefore, be replaced by the corresponding components in the coordinate system of the towing vehicle. This can be carried out on the basis of equation (1). However, transverse velocity $v_{KyZ}$, as well as articulation angle $\Delta\Psi$ are not measured and are, therefore, unknown. First, the articulation angle is estimated.

For the change in the articulation angle, it holds that:

$$\Delta\Psi = \omega_Z - \omega_A \quad (5)$$

or using equation (3):

$$\Delta\Psi = \omega_Z - \frac{V_{KyA}}{1_A}. \quad (6)$$

Transverse velocity $v_{KyZ}$ is typically minimal and can, therefore, be disregarded. The simplification $v_{KyZ}=0$ and equation (1) yield the following equation for the estimated value of the articulation angle:

$$\Delta\Psi = \omega_Z - \frac{v_{xZ}}{1_A} \cdot \sin\Delta\Psi. \quad (7)$$

This results in the differential equation:

$$\Delta\dot\Psi + \frac{v_{xZ}}{1_A} \cdot \sin\Delta\Psi = \omega_Z \quad (8)$$

into which only known measured quantities $v_{xZ}$ and $\omega_z$ from the towing vehicle and the constant parameter $1_A$ are entered. This differential equation can be integrated from one sampling step to the next, in the control unit using a simple numerical integration method, e.g., the rectangular rule or the trapezoidal rule, the sine function being approximated by a relatively simple characteristic curve. Another approach may use the linearization of sin x≈x for small angles, which results in a linear differential equation of the first order whose time constant is a function of velocity $v_{xZ}$.

Inserting equation (1) into equation (4) including the above simplification $v_{KyZ}=0$ results in the estimated equation for the transverse acceleration at the trailer/semitrailer axle:

$$a_{yAA} = \frac{v_{xz}^2}{1_A} \cdot \sin\Delta\Psi \cdot \cos\Delta\Psi \quad (9)$$

or $$a_{yAA} = \frac{1}{2}\frac{v_{xz}^2}{1_A} \cdot \sin 2\Delta\Psi \quad (10)$$

$\Delta\Psi$ being determined by solving differential equation (8). Using the sine function, one can proceed as described above.

Using equations (8) and (10), estimated values for the transverse acceleration at the trailer/semitrailer axle and for the articulation angle can be determined that are only a function of the measured quantities, i.e., forward velocity and yaw velocity of the towing vehicle, as well as of the constant distance from the kingpin to the trailer/semitrailer axle. This estimation presupposes that the trailer or semitrailer "is driven as if on a track," i.e., the slip angle of the trailer/semitrailer axle is equal to zero, and that the transverse velocity of the towing vehicle at the kingpin is negligible.

The supposition that the semitrailer/trailer is driven as if on a track results in the amount (or absolute value) of the transverse acceleration at the trailer/semitrailer axle tending to be estimated too high. Since, however, the estimation is intended to be used to prevent too drastic a braking action at the trailer/semitrailer, it is believed that this is not critical.

If transverse velocity $v_{KyZ}$ of the towing vehicle at the kingpin is measured or reliably estimated, the corresponding value can be used for the estimation of the articulation angle and of the transverse acceleration at the trailer/semitrailer axle. As a result, the equations indicated above only increase insignificantly in complexity. It is no longer necessary to presuppose a disappearing transverse velocity of the towing vehicle.

In this respect, the articulation angle $\Delta\Psi$ does not necessarily have to be estimated in the manner shown, but can also be measured. In this case, it is not necessary to estimate the articulation angle, and the measured value can be used directly in equation (10) to estimate the transverse acceleration.

In the event that distance $1_A$ between the kingpin and the trailer/semitrailer axle is not known exactly, a typical distance value can also be used for the represented calculation process.

In comparison to measurements taken by an experimental (or test) semitrailer/trailer equipped with sensors, the proposed estimation in accordance with the present invention yields particularly accurate (or excellent) results. The proposed linearization of the sine function in accordance with equation (8) or (10) does not negatively affect the accuracy of the results.

Figure 2:
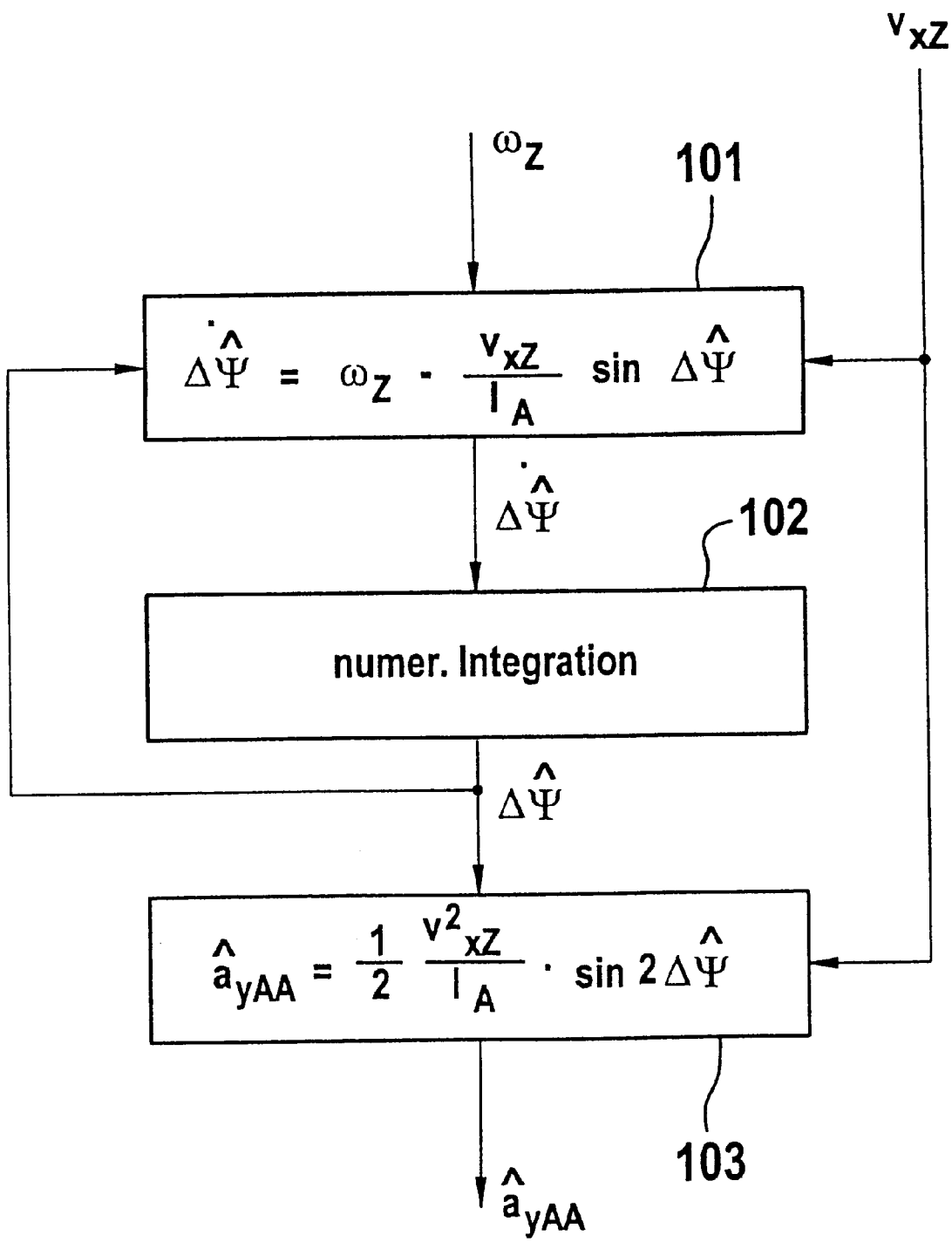
FIG. 2 is a flow chart representing the exemplary method according to the present invention.

The proposed estimation algorithm is again represented in FIG. 2, in the form of a block diagram or a flow chart of a corresponding control unit program. As already explained, the input variables are measured quantities $\omega_z$ and $v_{xZ}$, and the output variable is estimated value $a_{yAA}$ for the transverse acceleration at the trailer/semitrailer axle. Reference is made to the fact that the calculation procedure described in accordance with an exemplary method of the present invention can be verified, for example, in a control-unit code of a control unit that is employed.

According to FIG. 2, the differential equation according to equation (7) is evaluated based on input variables $\omega_Z$ und $v_{xZ}$ to determine the change per unit of time of estimated articulation angle $\Delta\Psi$ (step 101). In a subsequent step 102, the estimated articulation angle $\Delta\Psi$ is determined using the represented numerical integration of this value.

In a step 103, a transverse acceleration ayAA at the trailer/semitrailer axle is subsequently calculated in accordance with equation 10, on the basis of input variables $\Delta\Psi$ and $v_{xZ}$.

It is believed that the exemplary method should provide sufficiently exact results entailing minimal computational outlay in a control unit. The articulation angle is estimated using relatively simple numerical integration of a differential equation of the first order. It is believed to be advantageous to numerically integrate using relatively simple methods, e.g., rectangular rules or trapezoidal rules, in which the time increment of the integration is advantageously adjusted to the cycle time of the control unit. Other approaches may include approximating, using a characteristic curve, the sine function occurring in differential equation (7) or (8) and in the equation for the transverse acceleration at the trailer/semitrailer axle (equation 10), or linearizing the applied sine function.

When using the exemplary method according to the present invention, it is not necessary to determine vehicle parameters that are difficult to ascertain, such as mass, center of gravity, or the particular cornering stiffness of the tires.

Figure 3:
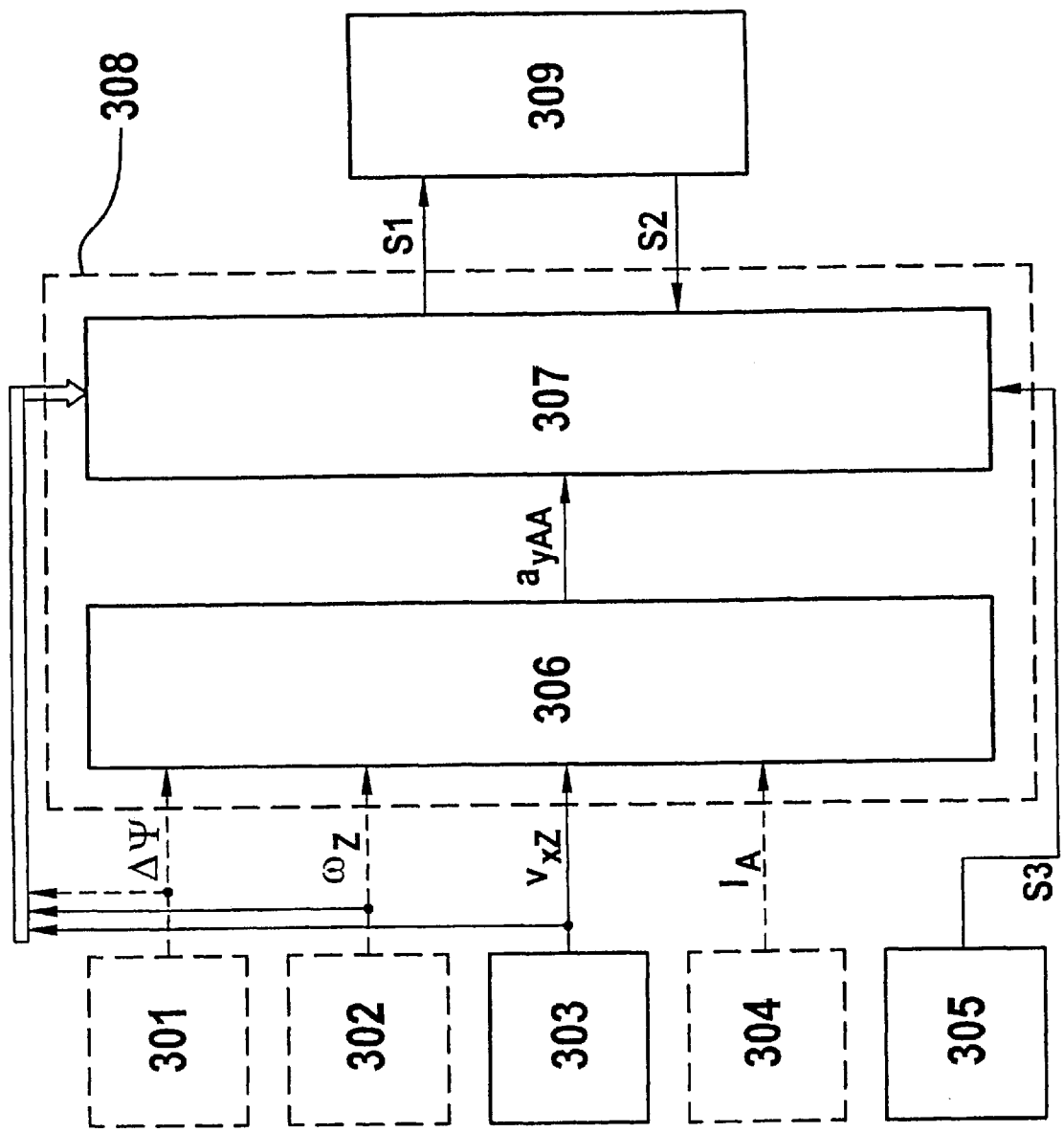
FIG. 3 is a block diagram representing the exemplary method according to the present invention.

The exemplary method according to the present invention is explained again using the block diagram represented in FIG. 3. In the block diagram, the following individual components can be recognized: 301 designates an articulation-angle sensor, the dotted line indicating that using this sensor represents an alternative to determining the articulation angle from $v_{xZ}$ und $\omega_Z$. When using such an articulation-angle sensor 301, a yaw-rate sensor, which is designated by reference numeral 302 and is explained below, is not necessary, unless yaw-rate sensor 302 is necessary within the framework of a control system, e.g. an electronic stability program (ESP).

The already mentioned yaw-rate sensor 302 is also represented by a dotted line, since it is not necessary according to the second exemplary method.

Reference numeral 303 designates a measuring arrangement or structure for measuring the forward velocity of the vehicle. Arrangements or structures for adjusting the distance between the kingpin and the semitrailer axle or between the trailer hitch and the trailer (quantity $1_A$) are designated as 304. Since these arrangements or structures are also optional, they are also indicated by a dotted line.

Additional sensor arrangements or structures are schematically represented as 305. In this instance, particularly when using an electronic stability program, vehicle steering-angle sensors or vehicle transverse-acceleration sensors should be included, for example.

Arrangements or structures for determining the transverse acceleration $a_{yAA}$ sought at the semitrailer or trailer are designated as 306. A controller core, e.g., ESP or the like, is designated as 307, and a control unit as 308. Finally, the actuator technology of the vehicle combination (e.g., an arrangement or structure for influencing the engine, and brakes of the towing vehicle of the semitrailer or trailer) is designated as 309. A determination arrangement or structure 306 provides a determined value of transverse acceleration $a_{yAA}$ to controller core 307. The individual components of the actuator technology are controlled with the aid of signals or quantities S1. With the aid of signals or quantities S2, controller core 307 receives information regarding the state of the individual components of actuator technology 309.

What is claimed is:

1. A method for estimating a transverse acceleration $a_{yAA}$ at an axle of at least one of a semitrailer and a trailer of a vehicle combination, which includes a towing vehicle and the at least one of the semitrailer and the trailer, the method comprising the steps of:
    at least one of measuring and estimating a yaw velocity $\omega_Z$ of the towing vehicle;
    at least one of measuring and estimating a forward velocity $v_{xZ}$ of the towing vehicle; and
    at least one of computationally correlating and performing a relational operation on the yaw velocity $\omega_Z$ and the forward velocity $v_{xZ}$ to obtain an estimated value of the transverse acceleration $a_{yAA}$ at the axle of the at least one of the semitrailer and the trailer.

2. The method of claim 1, wherein a distance $1_A$ between the axle of the at least one of the trailer and the semitrailer and one of a trailer hitch and a kingpin of the towing vehicle is considered in the step of at least one of computationally correlating and performing the relational operation.

3. The method of claim 2, wherein the articulation angle $\Delta\Psi$ is estimated based on its time derivation and on the yaw velocity $\omega_Z$ of the towing vehicle and a yaw velocity $\omega_A$ of the at least one of the semitrailer and the trailer, the yaw velocity $\omega_A$ being represented in the form of:

$$\frac{v_{xZ}}{1_A} \cdot \sin\Delta\Psi.$$

4. The method of claim 2, wherein the transverse acceleration $a_{yAA}$ of at least one of the trailer and the semitrailer is estimated according to one of the following:

$$a_{yAA} = \frac{v_{xZ}^2}{1_A} \cdot \sin\Delta\Psi \cdot \cos\Delta\Psi; \text{ and}$$

$$a_{yAA} = \frac{1}{2} \frac{v_{xZ}^2}{1_A} \cdot \sin 2\Delta\Psi; \text{ and one of}$$

$$a = \frac{v_{xZ}^2}{1_A} \cdot \sin\Delta\Psi \cdot \cos\Delta\Psi \text{ and}$$

$$a_{yAA} = \frac{1}{2} \frac{v_{xZ}^2}{1_A} \cdot \sin 2\Delta\Psi.$$

5. The method of claim 1, wherein, in the step of at least one of computationally correlating and performing the relational operation, one of the following conditions is satisfied: a transverse velocity existing at the at least one of the trailer and the semitrailer is equal to zero; and the axle of the at least one of the trailer and the semitrailer does not have a slip angle.

6. A method for estimating a transverse acceleration $a_{yAA}$ at an axle of at least one of a semitrailer and a trailer of a vehicle combination, which includes a towing vehicle and the at least one of the semitrailer and trailer, the method comprising the steps of:
    at least one of measuring and estimating the forward velocity $v_{xZ}$ of the towing vehicle;
    at least one of the measuring and estimating an articulation angle $\Delta\Psi$ between the towing vehicle and the at least one of the semitrailer and the trailer, the articulation angle $\Delta\Psi$ being between a longitudinal axis $x_Z$ of the towing vehicle and a longitudinal axis $x_A$ of the at least one of the semitrailer and the trailer;
    at least one of computationally correlating performing a relational operation on a yaw velocity $\omega_Z$ of the towing vehicle and the forward velocity $v_{xZ}$ to obtain an estimated value of the transverse acceleration $a_{yAA}$ at the axle of the at least one of the semitrailer and the trailer.

7. The method of claim 6, wherein a distance $1_A$ between the axle of the at least one of the trailer and the semitrailer and one of a trailer hitch and a kingpin of the towing vehicle is considered in the step of at least one of computationally correlating and performing the relational operation.

8. A device for estimating a transverse acceleration $a_{yAA}$ at an axle of at least one of a semitrailer and a trailer of a vehicle combination, which includes a towing vehicle and the at least one of the semitrailer and the trailer, the device comprising:
    an arrangement for at least one of measuring and estimating a yaw velocity $\omega_Z$ of the towing vehicle;
    an arrangement for at least one of measuring and estimating a forward velocity $v_{xZ}$ of the towing vehicle; and
    an arrangement for at least one of computationally correlating and performing a relational operation on the yaw velocity $\omega_Z$ and the forward velocity $v_{xZ}$ to obtain an estimated value of the transverse acceleration $a_{yAA}$ at the axle of the at least one of the semitrailer and the trailer.

9. A method for implementing a braking action on at least one of a semitrailer and a trailer of a towing vehicle, the method comprising the steps of:

estimating a transverse acceleration $a_{yAA}$ at an axle of the at least one of the semitrailer and the trailer by at least one of measuring and estimating a yaw velocity $\omega_Z$ of the towing vehicle, at least one of measuring and estimating a forward velocity $v_{xZ}$ of the towing vehicle, and at least one of computationally correlating and performing a relational operation on the yaw velocity $\omega_Z$ and the forward velocity $v_{xZ}$ to obtain an estimated value of the transverse acceleration $a_{yAA}$ at the axle of the at least one of the semitrailer and the trailer; and performing the braking action as a function of the transverse acceleration $a_{yAA}$ at the axle of the at least one of the semitrailer and the trailer.

* * * * *

UNITED STATES PATENT AND TRADEMARK OFFICE
CERTIFICATE OF CORRECTION

PATENT NO. : 6,522,956 B2  Page 1 of 1
DATED : February 18, 2003
INVENTOR(S) : Falk Hecker et al.

It is certified that error appears in the above-identified patent and that said Letters Patent is hereby corrected as shown below:

Title page,
Item [57], ABSTRACT,
Line 8, change "longitudinal axis $Z_A$," to -- longitudinal axis $X_A$ --

Column 4,
Line 27, change "$I_A$" to -- $1_A$ --

Column 6,
Line 42, change "$_{ay}AA$" to -- $a_{yAA}$ --

Signed and Sealed this

Eighth Day of June, 2004

JON W. DUDAS
*Acting Director of the United States Patent and Trademark Office*